United States Patent
Harashima et al.

(10) Patent No.: US 8,181,762 B2
(45) Date of Patent: May 22, 2012

(54) FRICTIONAL ENGAGING PISTON AND SPRING SEAT

(75) Inventors: Terasu Harashima, Toyota (JP); Shundou Yamaguchi, Anjo (JP)

(73) Assignees: Toyota Jidosha Kabuskiki Kaisha, Toyota-shi (JP); Aisin AW Co., Ltd., Anjo-Shi (JP)

( * ) Notice: Subject to any disclaimer, the term of this patent is extended or adjusted under 35 U.S.C. 154(b) by 660 days.

(21) Appl. No.: 12/360,623

(22) Filed: Jan. 27, 2009

(65) Prior Publication Data

US 2009/0188768 A1   Jul. 30, 2009

(30) Foreign Application Priority Data

Jan. 28, 2008   (JP) ................. 2008-016520

(51) Int. Cl.
  *F16D 25/12*   (2006.01)
(52) U.S. Cl. ................. 192/85.41; 92/130 D; 192/84.45
(58) Field of Classification Search .............. 192/85.45, 192/85.46; 92/130 D, 214; 475/146
See application file for complete search history.

(56) References Cited

U.S. PATENT DOCUMENTS

| | | | |
|---|---|---|---|
| 5,794,751 A * | 8/1998 | Kerendian | ................. 192/85.46 |
| 6,000,514 A | 12/1999 | Okada | |
| 6,786,843 B2 | 9/2004 | Mizuno | |
| 7,513,351 B2 | 4/2009 | Onishi et al. | |
| 2004/0231457 A1 * | 11/2004 | Miyazaki et al. | ........... 74/665 R |
| 2007/0256294 A1 | 11/2007 | Onishi et al. | |
| 2010/0032260 A1 | 2/2010 | Harashima et al. | |

FOREIGN PATENT DOCUMENTS

| | | |
|---|---|---|
| CN | 101057092 A | 10/2007 |
| JP | 07224911 | 8/1995 |
| JP | 10220501 | 8/1998 |
| JP | 11141662 | 5/1999 |
| JP | 2000081119 | 3/2000 |
| JP | 2003035327 | 2/2003 |
| JP | 2003106427 A | 4/2003 |
| JP | 2005325937 | 11/2005 |
| JP | 2006144879 A | 6/2006 |
| JP | 2007155071 | 6/2007 |
| JP | 2008038945 | 2/2008 |
| JP | 2008274998 | 11/2008 |

* cited by examiner

*Primary Examiner* — Rodney Bonck
(74) *Attorney, Agent, or Firm* — Gifford, Krass, Sprinkle, Anderson & Citkowski, P.C.

(57) ABSTRACT

An annular frictional engaging piston includes an annular pressure apply portion which pushes a frictional engagement element in an axial direction against urging force of a return spring that urges in a direction opposite the frictional engagement element, and which has a cutout portion where a portion in the circumferential direction has been removed to avoid interference between the piston and another member. A partially removed region is provided, and a mounting hole for mounting the return spring on the piston is provided in a region other than the partially removed region.

18 Claims, 9 Drawing Sheets

FRICTIONAL ENGAGING PISTON AND SPRING SEAT

INCORPORATION BY REFERENCE

The disclosure of Japanese Patent Application No. 2008-016520 filed on Jan. 28, 2008, including the specification, drawings and abstract is incorporated herein by reference in its entirety.

BACKGROUND OF THE INVENTION

1. Field of the Invention

The invention relates to an annular frictionally engaging piston that pushes, with an annular pressure apply portion, a frictional engagement element in the axial direction against urging force of a return spring that applies urging force in the direction opposite the frictional engagement element. The invention also relates to a spring seat for the return spring that is arranged opposing this frictionally engaging piston in the axial direction.

2. Description of the Related Art

Japanese Patent Application Publication No. 7-224911 (JP-A-7-224911) and Japanese Patent Application Publication No. 2000-81119 (JP-A-2000-81119) describe technology in which a frictional engagement element, such as a brake or a clutch used in an automatic transmission, is applied and released by a piston that is driven by pressure such as hydraulic pressure. The piston incorporated into this kind of mechanism in JP-A-7-224911 and JP-A-2000-81119 has a region that has been partially removed to avoid interfering with other mechanisms (such as a counter driven gear and sensors and the like) (hereinafter, this area will be referred to as the "partially removed region").

The frictionally engaging piston described in JP-A-2000-81119 has a plurality of pressure apply portions that protrude, making the shape of the piston complex. Also, stress concentrates at the gaps between multiple pressure apply portions so durability is insufficient. Therefore, as described in JP-A-7-224911, the structure in which the pressure apply portion of the piston is formed continuously in a region other than the partially removed region has a simple shape and is highly durable.

However, even with the structure described above, stress still tends to concentrate at the partially removed region. Multiple return springs must be arranged in the piston so multiple mounting holes are formed in the surface of the piston which faces a spring seat. However, in this structure, when the mounting holes are provided in the portion where the pressure apply portion is continuously formed, the mounting holes make the pressure apply portion, which is already weaker than the other portion in the partially removed region as described above, even thinner. As a result, those portions are much weaker than the other portions so the durability of the piston decreases, thus increasing the likelihood of cracking.

Furthermore, in JP-A-2000-81119, in order to reduce deformation on the spring seat side from the urging force of the return spring, an edge-shaped bent portion is provided which protrudes in the axial direction. Therefore, when this is combined with the piston via the spring described above, even though the piston does not interfere with other members at the partially removed region, the spring seat may interfere with other members because the curved portion extends in the axial direction.

SUMMARY OF THE INVENTION

This invention thus provides a more durable frictional engaging piston that has a mounting hole for a return spring, and a spring seat which fits together with this frictional engaging piston and can be arranged so as not to interfere with another member.

A first aspect of the invention relates to an annular frictional engaging piston that includes an annular pressure apply portion which pushes a frictional engagement element in an axial direction against urging force of a return spring that urges in a direction opposite the frictional engagement element, and which has a cutout portion where a portion in the circumferential direction has been removed to avoid interference between the piston and another member. In the annular frictional engaging piston, a partially removed region is provided, and a mounting hole for mounting the return spring on the piston is provided in a region other than the partially removed region.

According to this structure, the portion with the partially removed region that is already weaker than the other portion is not made thinner by the mounting hole so the strength of that portion is not much less than the strength of the other portion. Hence, the durability of the frictional engaging piston can be improved.

A second aspect of the invention relates to an annular frictional engaging piston that includes an annular pressure apply portion which pushes a frictional engagement element in an axial direction against urging force of a return spring that urges in a direction opposite the frictional engagement element, and which has a cutout portion where a portion in the circumferential direction has been removed to avoid interference between the piston and another member. In the annular frictional engaging piston, a partially removed region is provided, and a mounting hole for mounting the return spring on the piston is provided in a region other than at least one from among an adjacent region of the cutout portion and a region that is in the center in the circumferential direction within the partially removed region.

In the frictional engaging piston described above, the mounting hole may be provided in a region other than the adjacent region of the cutout portion within the partially removed region.

Stress tends to concentrate particularly at an adjacent region that is adjacent to a region where a portion has not been removed, so cracking tends to occur here first. According to the structure described above, by not providing a mounting hole in this adjacent region, the cracking prevention effect of the frictionally engaging piston can be effectively improved so durability can be improved even more even if the other portion in the partially removed region is made thinner by the mounting hole.

In the frictional engaging piston described above, the mounting hole may be provided in a region other than the region that is in the center in the circumferential direction within the partially removed region.

Stress also tends to concentrate in the region in the center in the circumferential direction within the partially removed region, so this region is also prone to cracking. According to the structure described above, the cracking prevention effect of the frictionally engaging piston can be effectively improved so durability can be improved even more even if the other portion in the partially removed region is made thinner by the mounting hole.

In the frictional engaging piston described above, the mounting hole may be provided in a region other than the adjacent region of the cutout portion and the region that is in the center in the circumferential direction within the partially removed region.

The cracking prevention effect of the frictionally engaging piston can be effectively improved so durability can be improved even more even if the other portion in the partially removed region is made thinner by the mounting hole.

A third aspect of the invention relates to an annular frictional engaging piston that includes an annular pressure apply portion which pushes a frictional engagement element in an axial direction against urging force of a return spring that urges in a direction opposite the frictional engagement element, and which has a cutout portion where a portion in the circumferential direction has been removed to avoid interference between the piston and another member. In the annular frictional engaging piston, a mounting hole for mounting the return spring on the piston is provided in a region other than a region where stress concentrates within the partially removed region.

According to this structure, the region where stress concentrates within the partially removed region, which is already weaker than the other portion, will not be made even thinner by the mounting hole so the strength of this portion is not much weaker than it is at another portion. Therefore, the durability of the piston increases.

A fourth aspect of the invention relates to an annular frictional engaging piston that includes an annular pressure apply portion which pushes a frictional engagement element in an axial direction against urging force of a return spring that urges in a direction opposite the frictional engagement element, and which has a cutout portion where a portion in the circumferential direction has been removed to avoid interference between the piston and another member. In the annular frictional engaging piston, a plurality of mounting holes are provided, and the mounting holes are provided such that an interval between the mounting holes in a region where stress concentrates is wider than the interval between the mounting holes in another region within the partially removed region.

According to this structure, the stress can be distributed so the strength is not much lower there than it is at other portions. Therefore, the durability of the piston can be improved.

In the frictional engaging piston described above, a plurality of the mounting holes may be provided, and an arrangement distribution of the mounting holes may be such that resultant force of the urging force of the return springs that are arranged in the mounting holes will not generate a moment in the piston which tilts the axis.

According to this structure, friction produced when the piston is driven can be suppressed so the piston can be driven smoothly.

In the frictional engaging piston described above, a plurality of the mounting holes may be provided; the plurality of mounting holes may be formed in a plurality of mounting hole groups; within the mounting hole groups, the mounting holes may be arranged at intervals that are narrower than the intervals between the plurality of mounting hole groups; and a region in which the density of the mounting holes provided is low may be a region between mounting hole groups.

According to this structure, the mounting holes are able to be easily set.

In the frictional engaging piston described above, the other member may be a counter driven gear that is arranged on an axis parallel to the piston.

According to this structure, even if the partially removed region is provided to avoid interference with the counter driven gear, by providing the mounting hole for the return spring as described above, the partially removed region does not become thinner, or even if it does become thinner due to the mounting hole, the durability of the frictional engaging piston can still be improved.

In the frictional engaging piston described above, the other member may be a rotation sensor. In this way, the other member with which interference is to be avoided is a rotation sensor. According to this structure, the partially removed region does not become thinner, or even if it does become thinner due to the mounting hole, the durability of the frictional engaging piston can still be improved.

In the frictional engaging piston described above, the other member may be a counter driven gear that is arranged on an axis parallel to the piston and a rotation sensor.

According to this structure, the partially removed region does not become thinner, or even if it does become thinner due to the mounting hole, the durability of the frictional engaging piston can still be improved.

In the frictional engaging piston described above, the frictional engaging piston may be formed of an aluminum alloy by aluminum die cast forming.

The frictional engaging piston is made of an aluminum alloy and is integrally formed by aluminum die cast forming so the degree of freedom in terms of shape is high. However, adhesion such as cure adhesion of a seal member is difficult. Therefore, a hydraulic fluid seal must be provided by forming the seal grooves and inserting O-rings into them. When seal grooves are formed in this way, the length in the axial direction increases so there may be interference with another member. Therefore, the partially cutout portion of the piston tends to be large in the axial direction. As a result, stress tends to concentrate even more at the partially removed region. However, according to the structure described above, the partially removed region does not become thinner, or even if it does become thinner due to the mounting hole, the durability of the frictional engaging piston can still be improved.

In the frictional engaging piston described above, the frictional engagement element may be a frictional engagement element of an automatic transmission. According to this structure, the frictional engaging piston can be provided in an automatic transmission and can thus contribute to a reduction in size and weight, as well as an increase in durability, of the automatic transmission.

In the frictional engaging piston described above, the pressure apply portion may extend toward the frictional engagement element side.

In the frictional engaging piston described above, the mounting hole may be a blind hole.

The frictional engaging portion described above may also include an annular base formed continuous with the inner peripheral side of the pressure apply portion. Also, the mounting hole may be provided in the base, and the partially removed region may be the base on the inner peripheral side of the cutout portion.

In the frictional engaging piston described above, a ratio of the area other than the mounting hole to the area of the provided mounting hole may be less in a region other than a partially removed region that includes the cutout portion than in a region other than the partially removed region.

A spring seat which is an annular or generally C-shaped spring seat for a return spring, which is arranged facing the frictional engaging piston described above in the axial direction, the spring seat may include a bent portion formed so as to protrude in the axial direction at a region other than the region facing the partially removed region.

According to this structure, the rigidity of the entire spring seat can be maintained, while interference with the other member can be reliably prevented. Further, the size in the axial direction of the structure of the spring seat combined with the piston can be reduced, which contributes to making the automatic transmission smaller and lighter.

In the spring seat described above, the spring seat may be formed by press forming a steel sheet.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
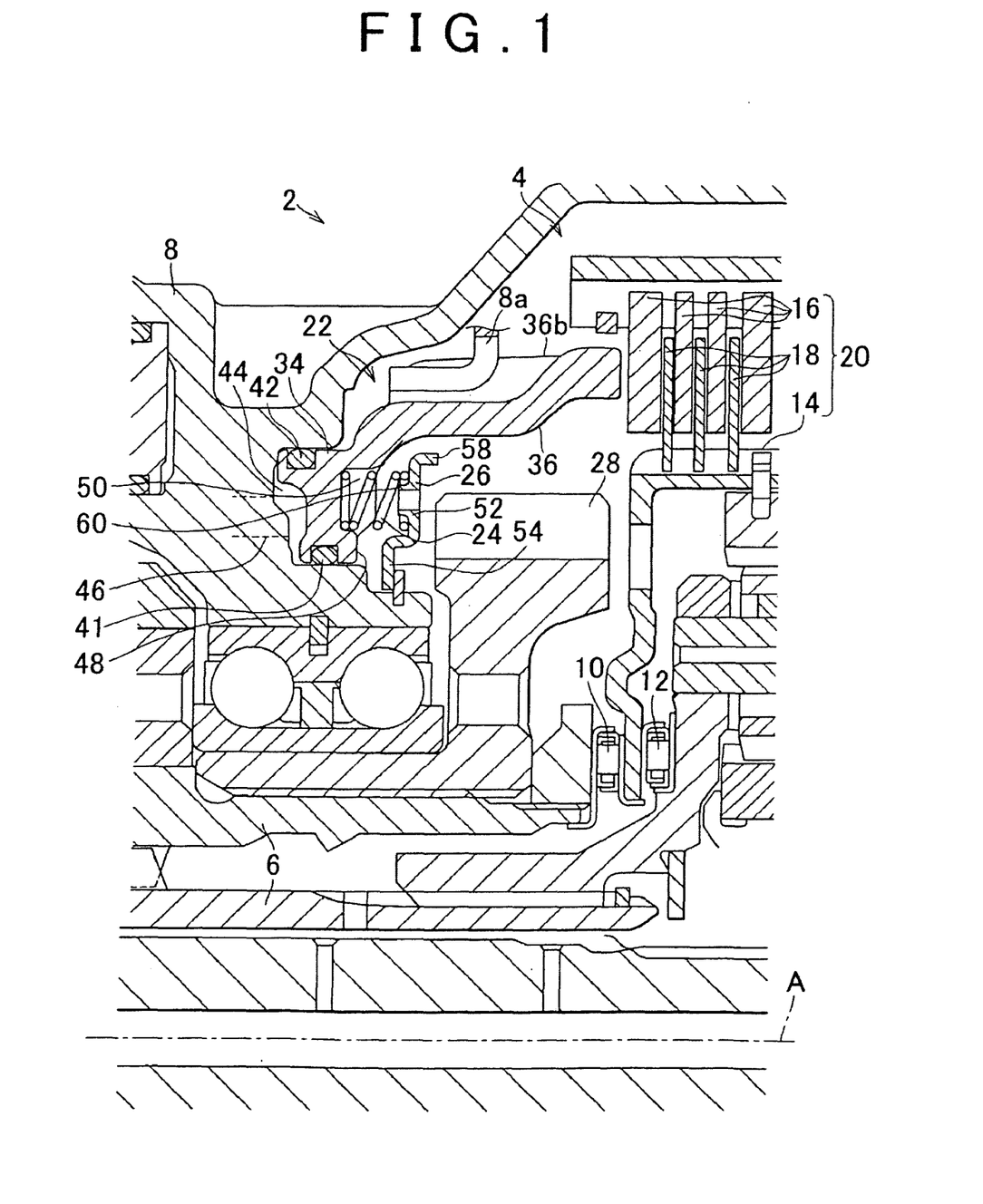
FIG. 1 is a sectional view of the main portions of the internal structure of an automatic transmission according to a first example embodiment of the invention.
Figure 2:
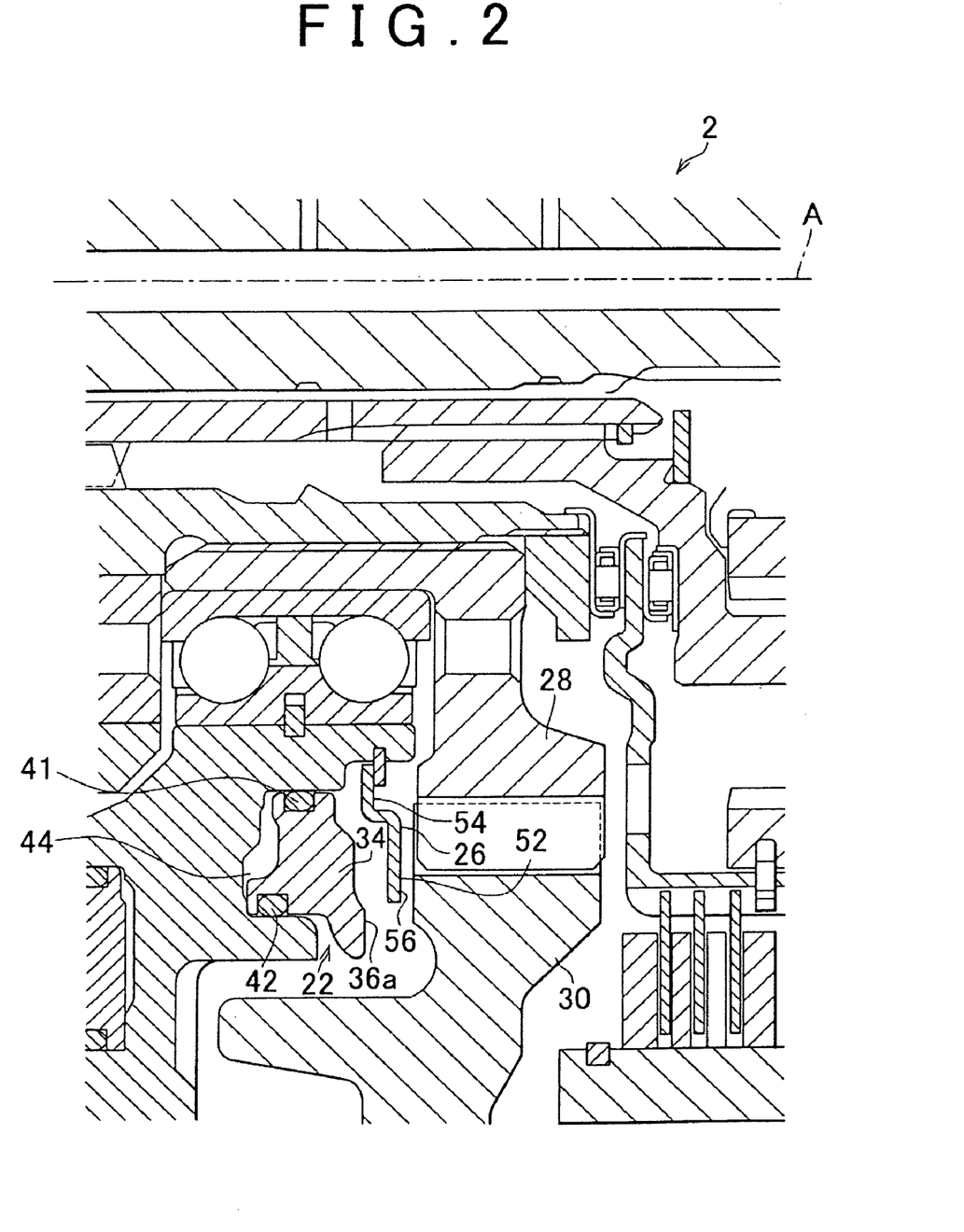
FIG. 2 is a sectional view of the main portions of the internal structure of the same automatic transmission at another phase.

FIGS. 1 and 2 are sectional views of some of the main portions of the internal structure, in this case, the structure near a brake 4, of an automatic transmission 2 according to a first example embodiment of the invention described above. FIGS. 1 and 2 show the sectional structure at different phases with respect to a central axis A.

The automatic transmission 2 is a planetary gear type automatic transmission for a vehicle. The automatic transmission 2 is arranged between an internal combustion engine and driving wheels, and transmits output from the internal combustion engine to the driving wheels via a torque converter. The brake 4 is connected via two one-way clutches 10 and 12, between a housing 8 and a support shaft 6 that is connected to a sun gear. This brake 4 mainly includes i) a frictional engagement portion 20 (which is an example of the frictional engagement element of the invention) which is made up of a clutch hub 14, separator plates 16, and friction plates 18, ii) a frictional engaging piston (hereinafter simply referred to as "piston") 22, iii) a return spring 24, and iv) a spring seat 26.

A counter gear is formed of a counter drive gear 28 and a counter driven gear 30 which are in mesh with each other. The piston 22 is positioned on the outer radial side of the counter drive gear 28, and the counter driven gear 30 (which is the object with which interference is to be avoided, and which is an example of the other member in the invention) is arranged on an axis parallel with the piston 22. In order to avoid interfering with the counter driven gear 30, the piston 22 has a cutout portion 36a where a portion of the piston 22 has been removed on the side of the portion where the counter drive gear 38 meshes with the counter driven gear 30.

Figures 3A, 3B:
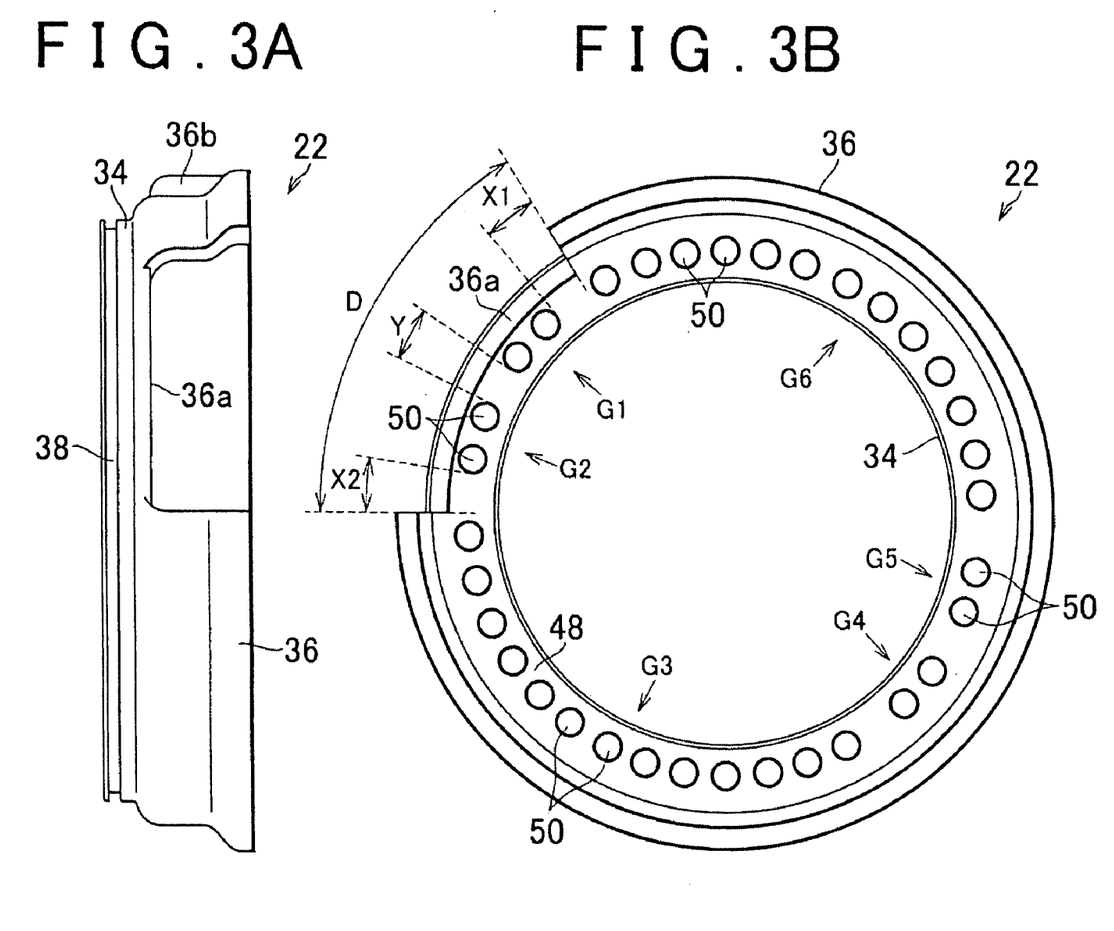
FIGS. 3A and 3B are diagrams showing the structure of a piston in the first example embodiment.
Figure 4A:
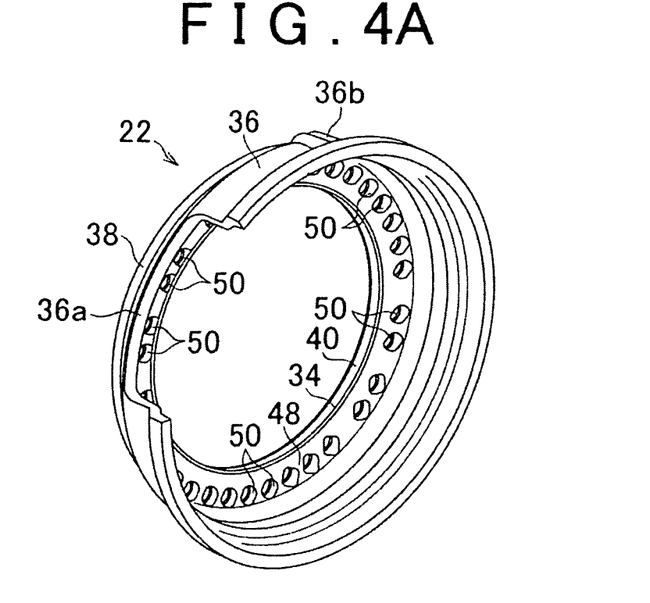
FIGS. 4A, 4B, and 4C are diagrams showing the structure of the same piston.
Figures 4B, 4C:
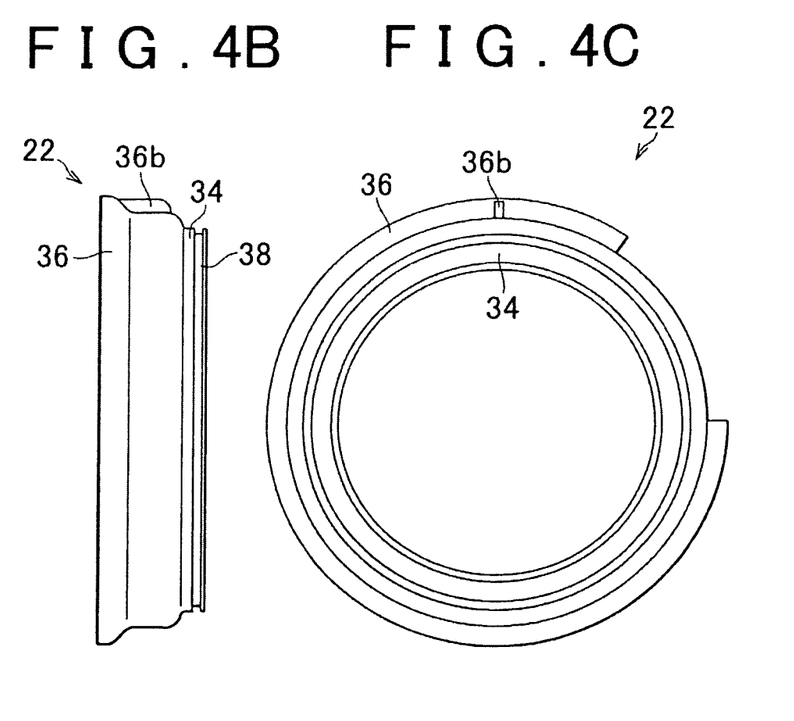

The overall shape of the piston 22 is shown in FIGS. 3A, 3B, and 4A to 4C. FIG. 3A is a left side view, FIG. 3B is a front view, FIG. 4A is a perspective view, FIG. 4B is a right side view, and FIG. 4C is a back view. The piston 22 is mainly formed by an annular base 34 and an annular pressure apply portion 36 that has a cutout portion 36a where a portion in the circumferential direction has been removed. The base 34 and the pressure apply portion 36 are integrally formed of an aluminum alloy by aluminum die cast forming. Seal grooves 38 and 40 are formed in an inner peripheral surface and an outer peripheral surface of the base 34, and O-rings 41 and 42 which are used as seals are arranged in these seal grooves 38 and 40, as shown in FIGS. 1 and 2, upon assembly into the automatic transmission 2. As a result, a hydraulic chamber 44 is formed between the base 34 and the housing 8. The piston can be operated in the axial direction by supplying hydraulic pressure to this hydraulic chamber 44 from a fluid passage 46 or discharging hydraulic pressure from this hydraulic chamber 44 into the fluid passage 46.

The pressure apply portion 36 is integrally formed with the base 34 on the outer peripheral side and forward (i.e., to the right in FIGS. 1 and 2) of the base 34, and extends toward the frictional engagement portion 20 that is at the front of the piston 22. As a result, when the piston 22 moves in the direction of the frictional engagement portion 20 due to an increase in hydraulic pressure in the hydraulic chamber 44, the pressure apply portion 36 pushes against the separator plates 16 of the frictional engagement portion 20, which in turn engage with the friction plates 18, preventing them from rotating.

Furthermore, a plurality of mounting holes 50 which are blind holes are formed in the front surface 48 on the inner peripheral side of the pressure apply portion 36 in the base 34. FIGS. 3 and 4 show examples in which there are 34 mounting holes 50. One end side of a return spring 24 that is arranged between the base 34 and the spring seat 26 is inserted into each of the 34 mounting holes 50 during assembly into the automatic transmission 2.

The 34 mounting holes 50 are formed in six mounting hole groups G1 to G6. Within these mounting hole groups G1 to G6, the intervals between the mounting holes 50 are narrow, but between the mounting hole groups G1 to G6, i.e., in six places in this case, the intervals are wider than they are within the mounting holes groups G1 to G6. Four mounting hole groups G1, G2, G4, and G5 are formed of two mounting holes 50 each, while two mounting holes groups G3 and G6 are formed of 13 mounting holes each. Incidentally, the number of mounting holes 50 in each mounting hole group G1 to G6 in this example embodiment is merely an example and may be set appropriately in view of the design of the piston 22 or the automatic transmission 2.

As shown in FIG. 3B, there is a phase region where the cutout portion 36a of the pressure apply portion 36 extends in the axial direction on the piston 22, i.e., a partially removed region D. This creates a region where stress tends to concentrate when the piston 22 is operating. This region where stress tends to concentrate is the partially removed region D, but more specifically, within this partially removed region D, stress tends to concentrate most at adjacent regions X1 and X2 which are adjacent to regions where the pressure apply portion 36 is not removed, and next at a center region Y which is in the center in the circumferential direction. That is, the region of the wide interval between the mounting hole groups G1 and G2 is designated as a center region Y, the region of the wide interval between the mounting hole groups G2 and G3 is designated as the adjacent region X2, and the region of the wide interval between the mounting hole groups G6 and G1 is designated as the adjacent region X1.

Incidentally, the region of the wide interval between the mounting hole groups G3 and G4 is formed corresponding to the interval between the mounting holes 50 at the adjacent region X1, the region of the wide interval between the mounting hole groups G4 and G5 is formed corresponding to the interval between the mounting holes 50 at the center region Y, and the region of the wide interval between the mounting hole groups G5 and G6 is formed corresponding to the interval between the mounting holes 50 at the adjacent region X2. That is, intervals that are the same as the intervals between the mounting holes 50 at the adjacent regions X1 and X2 and the center region Y in the partially removed region D are formed in positions that are 180° out of phase with the partially removed region D. This corresponding relationship prevents the resultant force of the urging force of the return spring 24 from generating a moment in the piston 22 which tilts the axis.

Figure 5A:
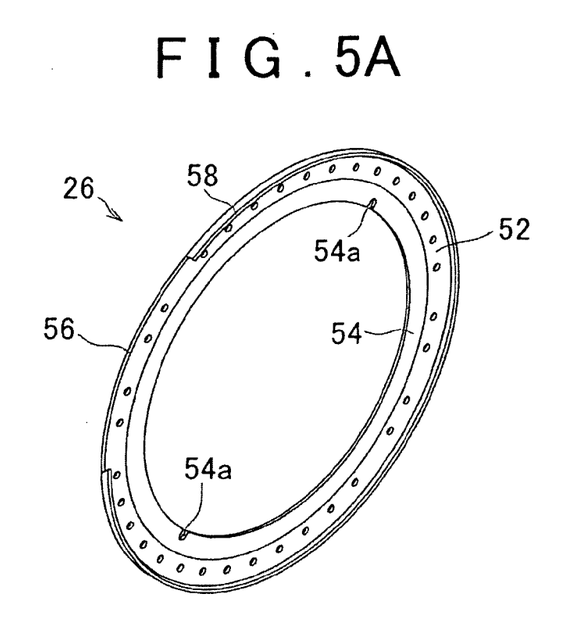
FIGS. 5A, 5B, and 5C are diagrams showing the structure of a spring seat in the first example embodiment.
Figure 5B:
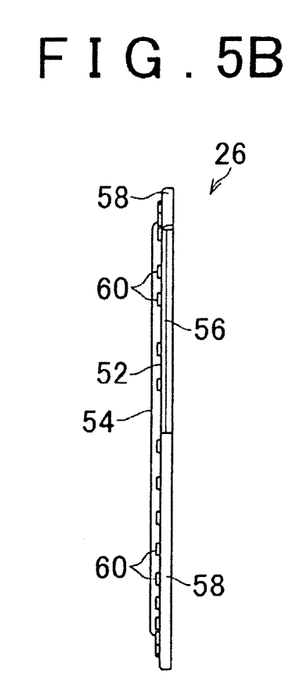
Figure 5C:
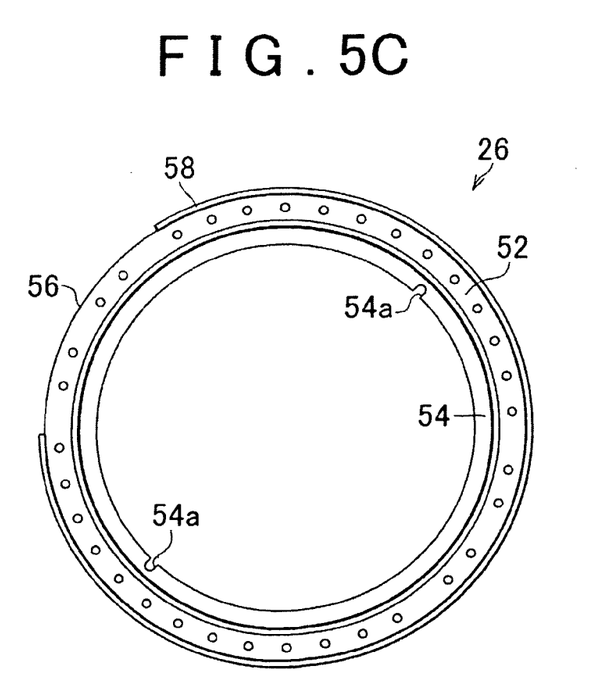
Figure 6A:
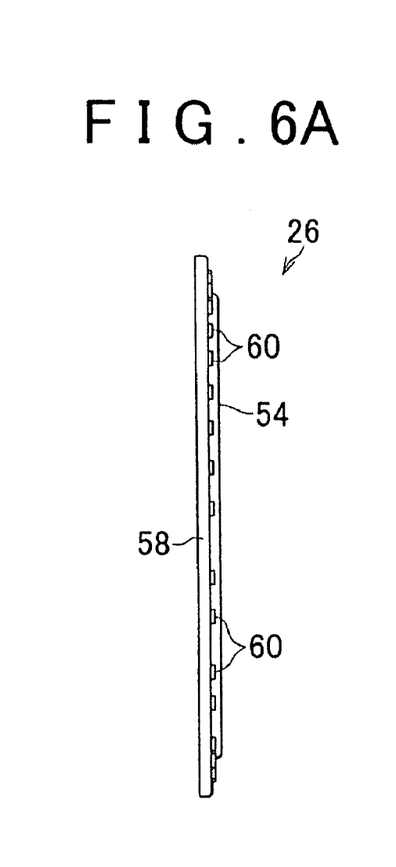
FIGS. 6A and 6B are diagrams showing the structure of the same spring seat.
Figure 6B:
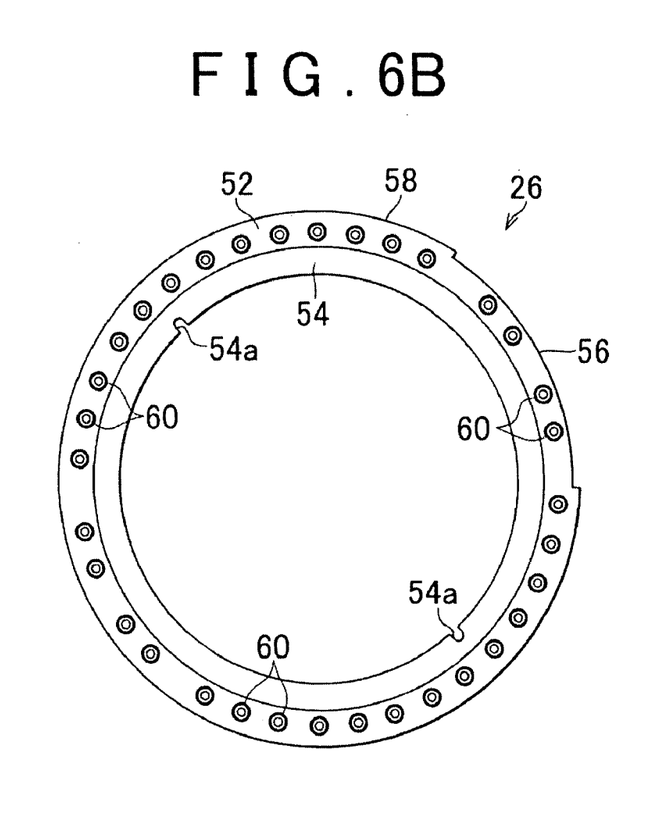

Incidentally, a protrusion 36b is formed on the outer peripheral surface of the pressure apply portion 36, which engages with a stopper 8a on the housing 8 side so as to prevent the piston 22 itself from rotating. The overall shape of the spring seat 26 is shown in FIGS. 5A to 5C and FIGS. 6A and 6B. FIG. 5A is a perspective view, FIG. 5B is a left side view, FIG. 5C is a front view, FIG. 6A is a right side view, and FIG. 6B is a back view. The spring seat 26 is mainly formed by i) an annular base 52, ii) an annular snap retaining portion 54 that is integrally formed with the base 52 to the radial inside of the base 52 via a step, and iii) a bent portion 58 which protrudes at a right angle from the outer periphery of the base 52 toward the front in the axial direction and has a cutout portion 56 which is a portion in the circumferential direction that is cut out. These are integrally formed by press forming a steel sheet.

When arranged in front of the piston 22 via the return spring 24 as shown in FIGS. 1 and 2, the cutout portion 56 is provided at the same phase width or a phase width that is slightly wider or narrower so that it corresponds with the cutout portion 36a in the partially removed region D on the piston 22 side. As a result, the bent portion 58 enables the rigidity of the spring seat 26 to be maintained, while the cutout portion 56 enables the spring seat 26 to avoid interfering with the counter driven gear 30.

A generally annular spring placement protrusion 60 is formed in a position on the base 52 that corresponds to each mounting hole 50 on the piston 22 side. During assembly into the automatic transmission 2, the return spring 24 is arranged in a compressed state between the mounting hole 50 and the spring placement protrusion 60, as shown in FIG. 1. As a result, the pressure apply portion 36 that presses the separator plates 16 against the friction engagement portions 20 when hydraulic pressure is supplied into the hydraulic chamber 44 can quickly be returned from the separator plate 16 side when the hydraulic pressure is reduced, such that the brake 4 can quickly be released.

A concave portion 54a is formed on the inside of the snap retaining portion 54. This concave portion 54a engages with a protrusion on the housing 8 side, thereby preventing the spring seat 26 itself from rotating. The first example embodiment described above yields the following effects.

The piston 22 is provided with the partially removed region D having the cutout portion 36a of the pressure apply portion 36 in order to avoid interfering with the counter driven gear 30. Within this partially removed region D, stress tends to concentrate particularly at the adjacent regions X1 and X2 which are adjacent to regions where a portion has not been removed, so cracks tend to originate here first. Therefore, even if the base 34 in the partially removed region D is thinner due to the mounting holes 50, the elimination of the mounting holes 50 at these adjacent regions can effectively prevent the piston 22 from cracking, thereby improving the durability of the piston 22.

Furthermore, the second most stress prone region where stress tends to concentrate is the center region Y in the circumferential direction in the partially removed region D, so this region also tends to crack. Therefore, the elimination of the mounting holes 50 from this center region Y makes it possible to even more effectively prevent the piston 22 from cracking, thereby further improving the durability of the piston 22, even if the base 34 in the partially removed region D is made thinner by the mounting holes 50.

Incidentally, the distribution of the mounting holes 50 in the partially removed region D is such that a region where stress concentrates is designated an excluded region, and the interval between the mounting holes 50 at this excluded region is wider than the intervals in other regions. As a result, the stress can be distributed such that the strength is not much lower there than it is at other portions, so it can be said that the durability of the piston 22 can be improved.

The resultant force of the urging force of the return spring 24 arranged in the mounting hole 50 can be distributed so as not to generate a moment in the piston 22 which tilts the axis, by forming pairs of mounting holes, with one of each pair being 180° out of phase with the other (i.e., at a 180° phase shift with respect to the other). As a result, friction produced when the piston 22 is driven can be suppressed so the piston 22 can be driven smoothly.

The piston 22 is made of an aluminum alloy and is integrally formed by aluminum die cast forming so the degree of freedom in terms of shape is high. However, adhesion such as cure adhesion of a seal member is difficult. Therefore, a hydraulic fluid seal must be provided by forming the seal grooves 38 and 40 and inserting O-rings into them. The piston 22 with this kind of structure tends to be long in the axial direction so it may interfere with the counter driven gear 30, so the cutout portion 36 may also be large in the axial direction. As a result, stress tends to concentrate even more at the partially removed region D. However, by forming the mounting holes 50 as described in this example embodiment, the cracking-prevention effect of the piston 22 can be improved, thus enabling the durability of the piston 22 to be improved, even if the partially removed region D is thin.

At the spring seat 26 as well, the bent portion 58 that protrudes in the axial direction is formed in the region other than the region facing the partially removed region D of the piston 22. As a result, the rigidity of the entire spring seat 26 can be maintained, while interference with the counter driven gear 30 can be reliably prevented by providing the cutout portion 56. Further, the size in the axial direction of the structure of the spring seat 26 combined with the piston 22 can be reduced, which contributes to making the automatic transmission 2 smaller and lighter.

Figure 7A:
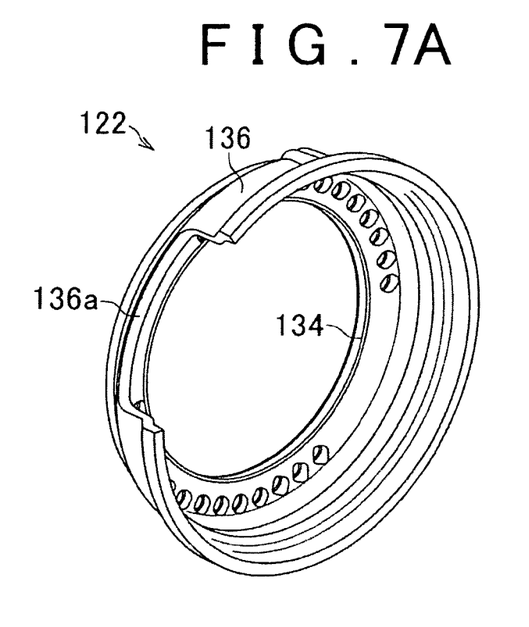
FIGS. 7A, 7B, and 7C are diagrams showing the structure of a piston according to a second example embodiment of the invention.
Figure 7B:
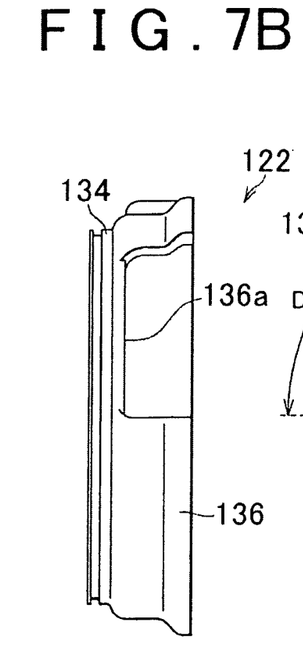
Figure 7C:
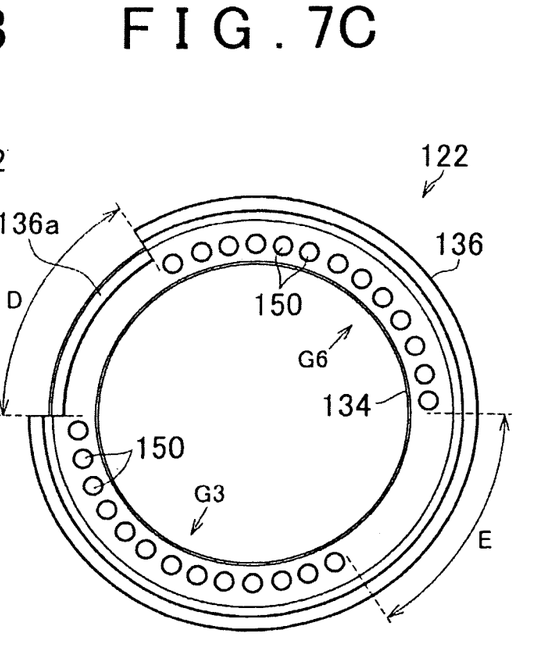
Figure 8A:
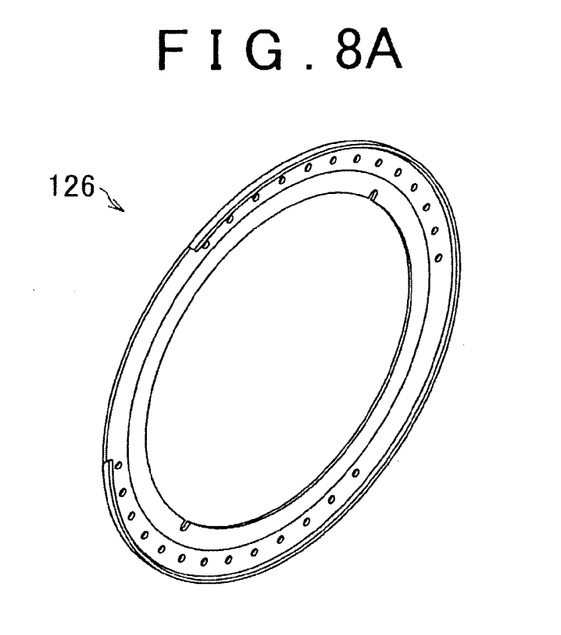
FIGS. 8A, 8B, and 8C are diagrams showing the structure of a spring seat in the second example embodiment.
Figure 8B:
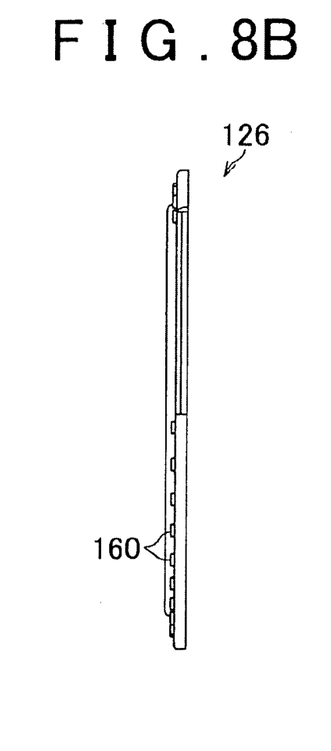
Figure 8C:
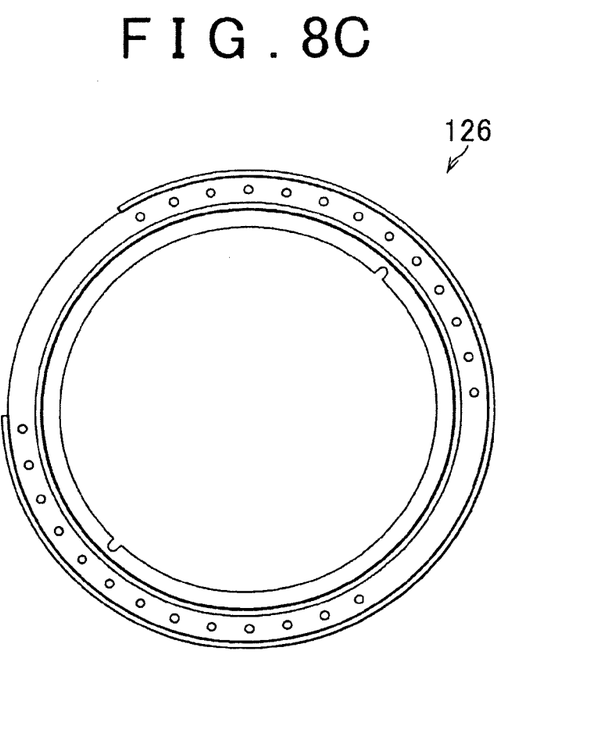
Figure 9A:
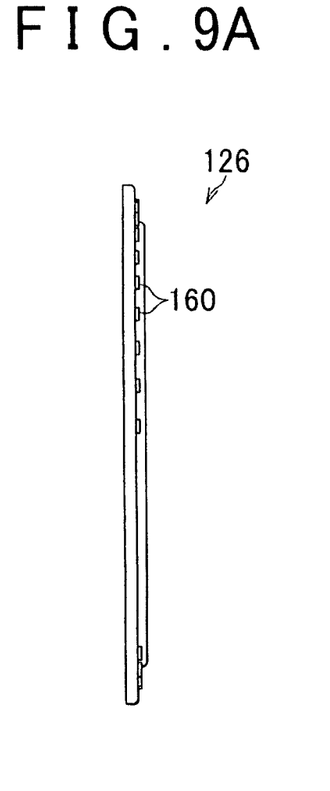
FIGS. 9A and 9B are diagrams showing the structure of the same spring seat.
Figure 9B:
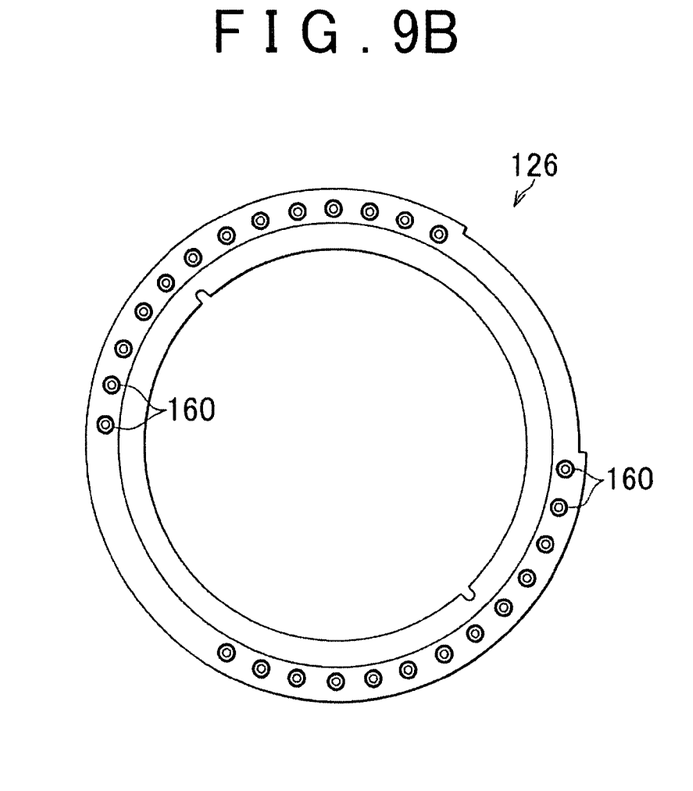

FIGS. 7A, 7B, and 7C show a piston 122 according to a second example embodiment of the invention. FIG. 7A is a perspective view, FIG. 7B is a left side view, and FIG. 7C is a front view. Incidentally, the right side view and the back view are the same as FIGS. 4B and 4C, respectively. FIGS. 8A to 8C and 9A and 9B show a spring seat 126. FIG. 8A is a perspective view, FIG. 8B is a left side view, FIG. 8C is a front view, FIG. 9A is a right side view, and FIG. 9B is a back view.

The piston 122 of this example embodiment has mounting holes 150 formed in a base 134. However, there are no mounting holes 150 provided in the partially cutout region D where there is a cutout portion 136a of a pressure apply portion 136 in this base 134. Moreover, there are also no mounting holes 150 provided in a region E that is 180° out of phase with the partially removed region D. That is, there are no mounting hole groups corresponding to the four mounting hole groups G1, G2, G4, and G5 as shown in FIG. 3B. There are only two mounting hole groups G3 and G6. The other structure of the piston 122 is the same as it is in the first example embodiment described above.

Correspondingly, spring mounting protrusions 160 on a spring seat 126 side are provided corresponding to the two mounting hole groups G3 and G6 of the piston 122. Incidentally, the spring constant of the return springs arranged between the mounting holes 150 in the piston 122 and the spring mounting protrusions 160 on the spring seat 126 is modified to compensate for the reduced number of return springs compared with the first example embodiment described above. The other structure of the automatic transmission is the same as it is in the first example embodiment described above.

The second example embodiment described above yields the following effects. It is possible to no provide any mounting holes 150 in the partially removed region D, as is the case in this example embodiment, and still obtain the same effects as those obtained in the first example embodiment.

In the first example embodiment described above, the mounting holes are removed from the excluded region by making the intervals in the adjacent regions X1 and X2 as well as in the center region Y wider than normal. However, stress tends to concentrate the most in the adjacent regions X1 and X2. Therefore, if the phase width of the partially removed region D of the piston is not small, it is possible to not provide mounting holes only in the adjacent regions X1 and X2. That is, mounting holes may be provided in the center region Y but not in the adjacent regions X1 and X2. As a result, return springs can also be arranged in the center region Y by arranging the spring mounting protrusions on the spring seat as well.

Also, if the cutout in the axial direction of the adjacent regions X1 and X2 is shallow and the cutout in the center region Y is deep, stress will concentrate in the center region Y so cracking may tend to occur there. In this case, it is possible to not provide mounting holes only in the center region Y That is, mounting holes may be provided in the adjacent regions X1 and X2 but not in the center region Y2. As a result, return springs can also arranged in the adjacent regions X1 and X2 by arranging the spring mounting protrusions on the spring seat as well.

In the example embodiment described above, the counter driven gear is the object that the piston is to avoid interfering with. However, the invention can also be applied to a case in which another member other than the counter driven gear that is arranged in the automatic transmission is the object that the piston is to avoid interfering with. For example, with a piston that interferes with a rotation sensor that detects rotation of an internal mechanism in the automatic transmission, a partially removed region is formed in the portion that interferes with the rotation sensor and return spring mounting holes are arranged as in the first and second example embodiments. Then a spring seat is given a structure that corresponds to the piston side. This enables the same effects to be obtained as those obtained by the first and second example embodiments.

The invention can also be applied just as it in the first and second example embodiments, in a case in which both the counter driven gear and the rotation sensor are objects that the piston is to avoid interfering with, and the same effects can be obtained. In each of the example embodiments described above, the mounting holes are formed in pairs, with one of each pair being 180° out of phase with the other (i.e., at a 180° phase shift with respect to the other). However, the distribution may also be such that it does not generate a moment in the piston which tilts the axis using other mounting hole combinations instead. For example, three mounting holes with a phase shift of 20° may form one group, and the adjacent regions X1 and X2 or the center region Y, or the entire partially removed region D, may be avoided.

In each of the example embodiments described above, the spring seat that is used is annular. Alternatively, however, the spring seat that is used may be generally C-shaped with a portion where no return springs are arranged cutout.

In the spring seat in each of the example embodiments described above, the inner peripheral side of the base forms the snap retaining portion, and the bent portion is formed on the outer peripheral side. Alternatively, however, the snap retaining portion may be formed on the outer peripheral side of the base and the bent portion may be formed on the inner peripheral side.

In each of the example embodiments described above, the piston applies pressure to a brake as a frictional engagement element. Alternatively, however, the piston may apply pressure to a clutch which serves as the frictional engagement element.

In each of the example embodiments described above, a ratio of the area other than the mounting hole to the area of the provided mounting hole may be less in a region other than a partially removed region that includes the cutout portion than in a region other than the partially removed region.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. An annular frictional engaging piston comprising:
an annular pressure apply portion which pushes a frictional engagement element in an axial direction against urging force of a return spring that urges in a direction opposite the frictional engagement element, the annular pressure apply portion having a cutout portion where a portion in the circumferential direction has been removed to avoid interference between the piston and another member;
an annular base having a partially removed region; and
a mounting hole for mounting the return spring on the piston is provided in a region other than the partially removed region.

2. The frictional engaging piston according to claim 1, wherein a plurality of mounting holes are provided, and an arrangement distribution of the mounting holes is such that resultant force of the urging force of the return springs that are arranged in the mounting holes will not generate a moment in the piston which tilts the axis.

3. The frictional engaging piston according to claim 1, wherein a plurality of mounting holes are provided; the plurality of mounting holes are formed in a plurality of mounting hole groups; within the mounting hole groups, the mounting holes are arranged at intervals that are narrower than the intervals between the plurality of mounting hole groups; and a region in which the density of the mounting holes provided is low is a region between mounting hole groups.

4. The frictional engaging piston according to claim 1, wherein the another member is a counter driven gear that is arranged on an axis parallel to the piston.

5. The frictional engaging piston according to claim 1, wherein the frictional engaging piston is formed of an aluminum alloy by aluminum die cast forming.

6. The frictional engaging piston according to claim 1, wherein the frictional engagement element is a frictional engagement element of an automatic transmission.

7. The frictional engaging piston according to claim 1, wherein the pressure apply portion extends toward the frictional engagement element side.

8. The frictional engaging piston according to claim 1, wherein the mounting hole is a blind hole.

9. The frictional engaging piston according to claim 1,
wherein the annular base is formed continuous with the inner peripheral side of the pressure apply portion,
wherein the mounting hole is provided in the base, and the partially removed region is the base on the inner peripheral side of the cutout portion.

10. The frictional engaging piston according to claim 1, wherein a ratio of the area other than the mounting hole to the area of the provided mounting hole is less in a region other than a partially removed region that includes the cutout portion than in a region other than the partially removed region.

11. A spring seat which is an annular or generally C-shaped spring seat for a return spring, which is arranged facing the frictional engaging piston according to claim 1 in the axial direction,
comprising a bent portion formed so as to protrude in the axial direction at a region other than the region facing the partially removed region.

12. The spring seat according to claim 11, wherein the spring seat is formed by press forming a steel sheet.

13. An annular frictional engaging piston comprising:
an annular pressure apply portion which pushes a frictional engagement element in an axial direction against urging force of a return spring that urges in a direction opposite the frictional engagement element, the annular pressure apply portion having a cutout portion where a portion in the circumferential direction has been removed to avoid interference between the piston and another member;
an annular base having a partially removed region; and
a mounting hole for mounting the return spring on the piston is provided in a region other than at least one from among an adjacent region of the cutout portion and a region that is in the center in the circumferential direction within the partially removed region.

14. The frictional engaging piston according to claim 13, wherein the mounting hole is provided in a region other than the adjacent region of the cutout portion within the partially removed region.

15. The frictional engaging piston according to claim 13, wherein the mounting hole is provided in a region other than the region that is in the center in the circumferential direction within the partially removed region.

16. The frictional engaging piston according to claim 13, wherein the mounting hole is provided in a region other than the adjacent region of the cutout portion and the region that is in the center in the circumferential direction within the partially removed region.

17. An annular frictional engaging piston comprising:
an annular pressure apply portion which pushes a frictional engagement element in an axial direction against urging force of a return spring that urges in a direction opposite the frictional engagement element, the annular pressure apply portion having a cutout portion where a portion in the circumferential direction has been removed to avoid interference between the piston and another member; and
an annular base having a partially removed region;
wherein a mounting hole for mounting the return spring on the piston is provided in a region other than a region where stress concentrates within the partially removed region.

18. An annular frictional engaging piston comprising:
an annular pressure apply portion which pushes a frictional engagement element in an axial direction against urging force of a return spring that urges in a direction opposite the frictional engagement element, the annular pressure apply portion having a cutout portion where a portion in the circumferential direction has been removed to avoid interference between the piston and another member;
an annular base having a partially removed region:
a plurality of mounting boles for mounting the return spring on the piston are provided; and
the mounting holes are provided such that an interval between the mounting holes in a region where stress concentrates is wider than the interval between the mounting holes in another region within the partially removed region.

* * * * *

UNITED STATES PATENT AND TRADEMARK OFFICE
CERTIFICATE OF CORRECTION

PATENT NO. : 8,181,762 B2
APPLICATION NO. : 12/360623
DATED : May 22, 2012
INVENTOR(S) : Terasu Harashima et al.

It is certified that error appears in the above-identified patent and that said Letters Patent is hereby corrected as shown below:

On the Title Page
Item (73) Assignee – delete "Kabuskiki", insert --Kabushiki--.

In the Specification
At column 2, line number 46, after more, insert --,--.

At column 2, line number 58, after more, insert --,--.

At column 3, line number 1, after more, insert --,--.

At column 3, line number 41, delete "moment", insert --movement--.

At column 8, line number 20, delete "moment", insert --movement--.

At column 8, line number 20, after in, delete "the piston 22 which tilts", insert --which the piston 22 tilts--.

At column 9, line number 16, delete "no", insert --not--.

At column 9, line number 36, after Y insert --.--.

In the Claims
At column 10, line number 49, delete "moment", insert --movement--.

At column 10, line number 58, after low delete "is", insert --in--.

At column 12, line number 32, delete ":", insert --;--.

Signed and Sealed this
Twenty-fifth Day of September, 2012

David J. Kappos
*Director of the United States Patent and Trademark Office*